US012753278B2

(12) United States Patent
Jiang et al.

(10) Patent No.: US 12,753,278 B2
(45) Date of Patent: Oct. 6, 2026

(54) CHLOROSULFONATED POLYPROPYLENE CARBONATE, AND PRODUCTION METHOD AND USE THEREOF

(71) Applicant: Changchun Institute of Applied Chemistry Chinese Academy of Sciences, Jilin Province (CN)

(72) Inventors: Wei Jiang, Changchun (CN); Jing Jin, Changchun (CN); Yunbao Gao, Changchun (CN); Nan Yan, Changchun (CN); Jun Yang, Changchun (CN)

(73) Assignee: CHANGCHUN INSTITUTE OF APPLIED CHEMISTRY CHINESE ACADEMY OF SCIENCES, Changchun City (CN)

( * ) Notice: Subject to any disclaimer, the term of this patent is extended or adjusted under 35 U.S.C. 154(b) by 243 days.

(21) Appl. No.: 17/799,162

(22) PCT Filed: Jun. 24, 2021

(86) PCT No.: PCT/CN2021/101997
§ 371 (c)(1),
(2) Date: Aug. 11, 2022

(87) PCT Pub. No.: WO2022/183637
PCT Pub. Date: Sep. 9, 2022

(65) Prior Publication Data
US 2024/0209147 A1 Jun. 27, 2024

(30) Foreign Application Priority Data
Mar. 3, 2021 (CN) ........................ 202110233721.7

(51) Int. Cl.
*C08G 64/42* (2006.01)
*C08F 8/38* (2006.01)
(Continued)

(52) U.S. Cl.
CPC ................ *C08G 64/42* (2013.01); *C08F 8/38* (2013.01); *C08G 64/0233* (2013.01);
(Continued)

(58) Field of Classification Search
CPC .............. C08G 64/025; C08G 64/0233; C08G 64/42; C08F 8/38
See application file for complete search history.

(56) References Cited

U.S. PATENT DOCUMENTS 4,104,264 A 8/1978 Dixon et al.
5,378,766 A 1/1995 Ito et al.
(Continued)

FOREIGN PATENT DOCUMENTS

CN 103012630 A 4/2013
CN 103881078 A 6/2014
(Continued)

OTHER PUBLICATIONS

Notice of Reasons for Refusal issued in Japanese Patent Application No. 2022-544661 on Jun. 14, 2023.
(Continued)

*Primary Examiner* — David J Buttner
*Assistant Examiner* — Surbhi M Du
(74) *Attorney, Agent, or Firm* — Morse, Barnes-Brown & Pendleton, P.C. Erin E. Bryan, Esq. Russell L. Widom, Ph.D.

(57) ABSTRACT

The present disclosure provides a chlorosulfonated polypropylene carbonate having a structure represented by Formula I, and the production method and use thereof in the fields of binders, stickers, coatings, and others. The present disclosure introduces a highly active chlorosulfonyl group into the molecular chain of polypropylene carbonate, the molecular weight of the final product is decreased at a different degree,
(Continued)

and the interface compatibility of the polypropylene carbonate with various substrates can be effectively adjusted and controlled, so that the state and viscosity of the product are modified. At the same time, the chlorosulfonated polypropylene carbonate is also a fully biodegradable material.

Formula I

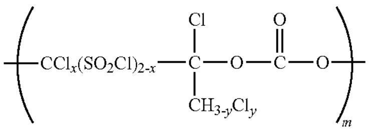

5 Claims, 4 Drawing Sheets

(51) Int. Cl.
*C08G 64/02* (2006.01)
*C09D 169/00* (2006.01)
*C09J 169/00* (2006.01)

(52) U.S. Cl.
CPC ......... *C08G 64/025* (2013.01); *C09D 169/00* (2013.01); *C09J 169/00* (2013.01); *Y02W 90/10* (2015.05)

(56) References Cited

U.S. PATENT DOCUMENTS

| | | | | |
|---|---|---|---|---|
| 9,125,973 | B2 * | 9/2015 | Bui | A61L 31/16 |
| 2009/0043071 | A1 | 2/2009 | Brunelle et al. | |

FOREIGN PATENT DOCUMENTS

| | | | | |
|---|---|---|---|---|
| CN | 104449521 | A | 3/2015 | |
| CN | 105218820 | A | 1/2016 | |
| CN | 109666138 | A | 4/2019 | |
| CN | 113004509 | A | 6/2021 | |
| WO | 2014042603 | A1 | 3/2014 | |
| WO | WO-2019232589 | A1 * | 12/2019 | A61B 17/866 |

OTHER PUBLICATIONS

Supplementary European Search Report for Application No. EP21923604 mailed Dec. 11, 2024.
Office Action for Application No. 202110233721.7 dated Oct. 9, 2021.
Office Action for Application No. 202110233721.7 dated Mar. 16, 2022.
International Search Report for Application No. PCT/CN2021/101997 dated Nov. 22, 2021.
Florjanczyk, Z. et al., Terpolymerization of Sulfur Dioxide with Oxiranes and Cyclic Anhydrides, Macromol. Chem. Phys., 203:3(565-572), Feb. 18, 2002.

* cited by examiner

CHLOROSULFONATED POLYPROPYLENE CARBONATE, AND PRODUCTION METHOD AND USE THEREOF

CROSS REFERENCE TO RELATED APPLICATIONS

This patent application is the national stage of International Patent Application No. PCT/CN2021/101997, filed on Jun. 24, 2021, which claims the benefit and priority of Chinese Patent Application No. 202110233721.7, filed on Mar. 3, 2021. The disclosures of both applications are incorporated by reference in their entirety.

TECHNICAL FIELD

The present disclosure relates to the technical fields of polymeric materials and production technology thereof, in particular, to a chlorosulfonated polypropylene carbonate, and the production method and use thereof.

BACKGROUND ART

Carbon dioxide is a greenhouse gas, and as a modern chemical material, it has the advantages of being cheap, ease available and abundant in reserves. The large-scale fixation of carbon dioxide into materials for the chemical industry has become a new research hotspot. Polypropylene carbonate (PPC) is a fully biodegradable copolymer synthesized from carbon dioxide and propylene oxide as raw materials. Although polypropylene carbonate has now entered into the stage of industrial production, as an amorphous polymer having a glass transition temperature of only about 35° C., it is brittle with low tensile strength and low elongation at break at room temperature; and it has high thermal sensitivity and poor dimensional stability in the high temperature state, which defects make it difficult to be used as plastic alone.

Hence, the industry is constantly conducting corresponding research and modification on polypropylene carbonate. Chlorinated polypropylene carbonate (CPPC) is a modified polypropylene carbonate that is subjected to a chlorination reaction, which has relatively good processability and greatly improved mechanical properties. As an example, the present applicant has previously disclosed a production method for chlorinated polypropylene carbonate in the application with the publication number CN103881078A, and that patent application provides a chlorinated polypropylene carbonate and a production method thereof. Since chlorine atoms have relatively strong electronegativity, which can enhance the interaction between the chlorinated polypropylene carbonate and other polar materials. After the introduction of chlorine atoms, hydrogen bond interactions can be generated between chlorinated polypropylene carbonates, so that both the processability and mechanical properties thereof are improved, and the chlorine atoms can improve the flame retardant properties of chlorinated polypropylene carbonate materials. As another example, the patent application with the publication number CN107793732A also discloses a production method for a modified polypropylene carbonate, comprising mixing a crude polypropylene carbonate product obtained after the copolymerization of carbon dioxide and propylene oxide, with an amine-based compound in a mass ratio of 99.9-80.0: 0.1-20.0, to give a modified polypropylene carbonate precursor, wherein the amine-based compound is reacted with the cyclic carbonate in the crude polypropylene carbonate product to produce a urethane compound; meltkneading the modified polypropylene carbonate precursor to obtain a modified polypropylene carbonate. This method achieves the toughening and strengthening modification of polypropylene carbonate by using an amine-based compound as a modifier. As yet another example, the patent application with the publication number CN102153683B discloses a method for producing chlorosulfonated polyethylene by a gas-solid-liquid three-phase reaction, comprising adding chlorinated polyethylene powder and an anti-adhesive into a multi-layer stirring fixed bed reactor; introducing atomized sulfuryl chloride under UV irradiation and stirring; controlling the reaction temperature less than 80° C.; replacing the waste gas with nitrogen gas after completion of the reaction; rinsing with water to remove the by-products; and performing centrifugal for dehydration and hot-air drying, so as to obtain the chlorosulfonated polyethylene product.

However, relevant studies on modification are still relatively few so far, and most of the modification methods are relatively complicated, which are difficult to be directly applied to industrialized large-scale application.

Therefore, how to find a new modified polypropylene carbonate, broaden the research approaches of polypropylene carbonate, lay a foundation for applications in various aspects in the future, and at the same time be more suitable for industrialized large-scale application, has become one of the focal points of many forward-looking researchers, and it is of great significance.

SUMMARY OF INVENTION

(I) Technical Problem to be Solved

In view of the above problems, the present disclosure provides a chlorosulfonated polypropylene carbonate and the production method and use thereof, so as to at least partially solve the technical problems for polypropylene carbonate in the art, such as complexity in the modification methods, difficulty in industrialized large-scale application, and the like.

(II) Technical Solution

In one aspect, the present disclosure provides a chlorosulfonated polypropylene carbonate, characterized by having a structure represented by Formula I, Formula I

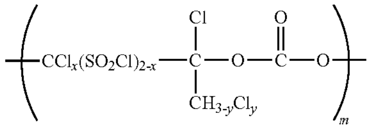

wherein x is 0 or 1; y is an integer of 0-3; and m is the degree of polymerization.

Further, m is 10-500.

Further, the chlorosulfonated polypropylene carbonate has a number-average molecular weight of 2,000-110,000 Daltons.

Further, the chlorosulfonated polypropylene carbonate is a biodegradable material.

In another aspect, the present disclosure provides a production method of a chlorosulfonated polypropylene carbonate comprising a following step:

subjecting polypropylene carbonate and/or chlorinated polypropylene carbonate together with a chlorosulfonation reagent to a chlorosulfonation reaction, to obtain the chlorosulfonated polypropylene carbonate.

Further, the chlorosulfonation reagent comprises one or more of sulfuryl chloride, chlorosulfonic acid and sulfur dioxide gas; and the mass ratio of the polypropylene carbonate and/or chlorinated polypropylene carbonate to the chlorosulfonation reagent is 1.5:1 to 7.4:1.

Further, the temperature for the chlorosulfonation reaction is 60-120° C.; and the time for the chlorosulfonation reaction is 20-120 min.

Further, the raw material for the chlorosulfonation reaction further comprises an auxiliary agent; and the mass ratio of the polypropylene carbonate and/or chlorinated polypropylene carbonate to the auxiliary agent is 20:1 to 20:4.

Further, the auxiliary agent comprises a dispersing agent; and the dispersing agent comprises one or more of silica, white carbon black, calcium carbonate and talcum powder.

In yet another aspect, the present disclosure provides use of the chlorosulfonated polypropylene carbonate or the chlorosulfonated polypropylene carbonate produced according to the production method for chlorosulfonated polypropylene carbonate in a field of binders, stickers or coatings.

(III) Beneficial Effects

The embodiments of the present disclosure provide a chlorosulfonated polypropylene carbonate and the production method and use thereof. As compared with the existing polypropylene carbonate and chlorinated polypropylene carbonate, the present disclosure is designed to obtain a chlorosulfonated polypropylene carbonate with a specific structure. Due to the combined action of the group and chlorine element, the electronegativity is greatly increased, and the electron-withdrawing ability is sharply increased, so that it can be interacted with other materials better, thereby it can be applied in the fields of binders, stickers, coatings, and others. The present disclosure introduces a highly active chlorosulfonyl group into the molecular chain of polypropylene carbonate. The molecular weight of the final product is decreased as compared with the raw material, and the interface compatibility of the polypropylene carbonate with respect to various substrates can be effectively adjusted and controlled, so that the state and viscosity of the product are modified. At the same time, the chlorosulfonated polypropylene carbonate is also a fully biodegradable material. The present disclosure is based on a biodegradable material, polypropylene carbonate, and is intended to produce a fully biodegradable material, chlorosulfonated polypropylene carbonate, which is an absolutely novel polymeric material, either in terms of the structure or the properties, by using a one-pot reaction between polypropylene carbonate and sulfuryl chloride.

The present disclosure also provides a synthesis route for producing chlorosulfonated polypropylene carbonate via a one-pot reaction, wherein the chlorosulfonated polypropylene carbonate is produced by a mixed one-pot process, in which sulfuryl chloride is reacted with polypropylene carbonate directly, and the use of chlorine gas and other organic solvent chlorine is avoided. This route has advantages, for example, the method is simple and easily carried out, and the pollution of environment is less, thereby not only the negative influence of organic solvents on the environment can be prevented, but also products in various states can be obtained through adjustment and control of the reaction time and temperature, so that it is more suitable for industrialized large-scale application. The experimental results showed that the present disclosure successfully obtains chlorosulfonated polypropylene carbonate via a one-pot process, and achieves the adjustment and control for molecular weight in a range of 4,000-110,000, obtaining products in various states with different viscosity, which can be used in the fields of binders, stickers and coatings, etc.

DETAILED EMBODIMENTS

Figure 1:
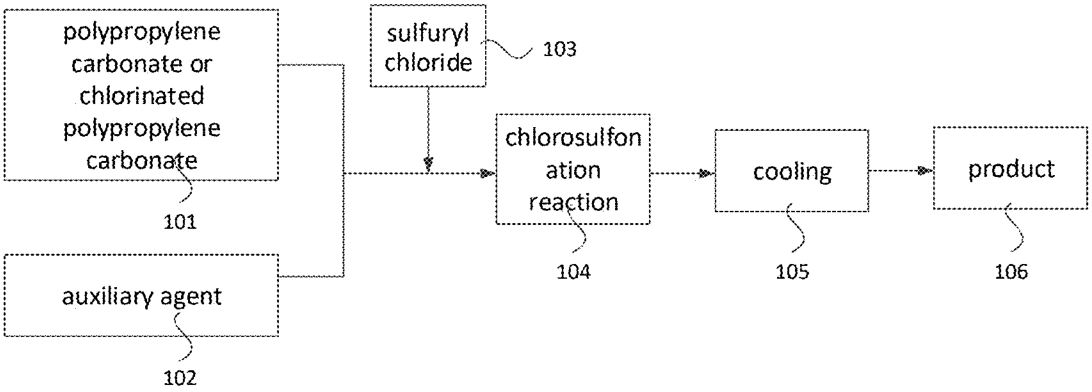
FIG. 1 shows schematically a brief flow chart of a process for chlorosulfonated polypropylene carbonate according to an example of the present disclosure.

In order to make the purposes, the technical solutions and the advantages of the present disclosure clearer and more apparent, the present disclosure will be further described in detail in combination with specific examples and with reference to the drawings.

There is no particular limitation to the sources of all materials of the present disclosure. Raw materials may be commercially available or prepared by conventional methods well known by those skilled in the art.

There is no particular limitation to the purity of all materials of the present disclosure. In the present disclosure, preferably, raw materials are analytically pure or meet the purity standards related to the field of producing polypropylene carbonate-based materials.

In the present disclosure, for any raw material, the source and abbreviation thereof belong to the conventional source and abbreviation in the field respectively, and are clear and unambiguous in the field of related applications thereof. According to the abbreviation and corresponding applications, those skilled in the art may purchase it on the market or prepare it by conventional methods.

In particular, many new structures or substituent groups are involved in the present disclosure. Therefore, for the nomenclature of the above-mentioned structures and groups, the present disclosure names them according to the nomenclature well-known in the art. Those skilled in the art can clearly and unambiguously understand the meaning to be expressed in the present disclosure based on the common knowledge in the art. Among them, due to the difference in nomenclature principles, the names of some structures and substituent groups may not be unique. In the present disclosure, reference may also be made based on reaction mechanisms, reaction schemes and specific structural formulae.

The present disclosure provides a chlorosulfonated polypropylene carbonate having a structure represented by Formula I, Formula I

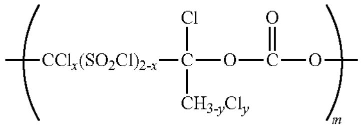

wherein x is 0 or 1; y is an integer of 0-3; and m is the degree of polymerization.

In the present disclosure, x is selected from 0 or 1; and y is selected from an integer of 0-3, including 0, 1, 2 or 3.

In the present disclosure, m is the degree of polymerization, and m is preferably 10-500, more preferably 10-300, and even more preferably 15-200.

In the present disclosure, the chlorosulfonated polypropylene carbonate preferably has a number-average molecular weight of 2,000-110,000 Daltons, more preferably 3,000-50,000 Daltons, more preferably 4,000-40,000 Daltons, and even more preferably 5,000-30,000 Daltons.

In the present disclosure, the chlorosulfonated polypropylene carbonate is preferably obtained by reacting polypropylene carbonate and/or chlorinated polypropylene carbonate with sulfuryl chloride.

In the present disclosure, the chlorosulfonated polypropylene carbonate is a biodegradable material.

In the present disclosure, the chlorosulfonated polypropylene carbonate includes a chlorosulfonated polypropylene carbonate adhesive.

Introduction of a high active chlorosulfonyl group into the molecular chain of polypropylene carbonate in the present disclosure can not only enhance the interface compatibility of the polypropylene carbonate with respect to a substrate, but also can be achieved via a simple and easy process, which does not use any organic solvent, has less pollution to the environment, needs to add only a small amount of auxiliary agents or no any reactive auxiliary agent at all according to the field of applications, and produces a fully biodegradable reaction product with the advantage of low cost.

The present disclosure provides a production method for chlorosulfonated polypropylene carbonate comprising: subjecting polypropylene carbonate and/or chlorinated polypropylene carbonate together with a chlorosulfonation reagent to a chlorosulfonation reaction, so as to obtain the chlorosulfonated polypropylene carbonate.

In the present disclosure, preferably, the structure, parameter and degree of polymerization of the chlorosulfonated polypropylene carbonate in the production method for chlorosulfonated polypropylene carbonate and the preferred embodiments thereof may correspond to the structure, parameter and degree of polymerization of the chlorosulfonated polypropylene carbonate mentioned above and the preferred embodiments thereof one by one, and it is not repeated one by one here.

In the present disclosure, a chlorosulfonated polypropylene carbonate is obtained by performing a chlorosulfonation reaction between polypropylene carbonate and/or chlorinated polypropylene carbonate and a chlorosulfonation reagent.

There is no particular limitation to the source of polypropylene carbonate or chlorinated polypropylene carbonate. The polypropylene carbonate or chlorinated polypropylene carbonate may be commercially available or prepared by conventional methods well known by those skilled in the art. In the present disclosure, the chlorinated polypropylene carbonate may be prepared by the production method for chlorinated polypropylene carbonate provided in the patent application with the publication number CN103881078A.

In the present disclosure, preferably, the chlorosulfonation reagent comprises one or more of sulfuryl chloride, chlorosulfonic acid and sulfur dioxide gas, more preferably sulfuryl chloride, chlorosulfonic acid or sulfur dioxide gas.

In the present disclosure, preferably, the mass ratio of the polypropylene carbonate and/or chlorinated polypropylene carbonate to the chlorosulfonation reagent is (1.5-7.4): 1, more preferably (2.5-6.4): 1, and even more preferably (3.5-5.4): 1.

In the present disclosure, preferably, the temperature of the chlorosulfonation reaction is 60-120° C., more preferably 70-110° C., and even more preferably 80-100° C.

In the present disclosure, preferably, the time of the chlorosulfonation reaction is 20-120 min, more preferably 40-100 min, and even more preferably 60-80 min.

In the present disclosure, preferably, the raw material for the chlorosulfonation reaction further comprises an auxiliary agent.

In the present disclosure, preferably, the mass ratio of the polypropylene carbonate and/or chlorinated polypropylene carbonate to the auxiliary agent is 20: (1-4), more preferably 20: (1.5-3.5), and even more preferably 20: (2-3).

In the present disclosure, preferably, the auxiliary agent comprises a dispersing agent.

In the present disclosure, preferably, the dispersing agent comprises one or more of silica, white carbon black, calcium carbonate and talcum powder, more preferably silica, white carbon black, calcium carbonate or talcum powder.

In the present disclosure, chlorosulfonated polypropylene carbonate is obtained for the first time by reacting polypropylene carbonate or chlorinated polypropylene carbonate with sulfuryl chloride, so that the viscosity and molecular weight of the product can be adjusted in a certain range, and the chlorosulfonated polypropylene carbonate is fully biodegradable. At the same time, chlorosulfonated polypropylene carbonates in various states are obtained for the first time by adjusting the time and temperature of the chlorosulfonation reaction. In the present disclosure, chlorosulfonated polypropylene carbonate is produced via a one-pot reaction, so that no chlorine-containing organic solvent is required, thereby maximally decreasing the negative influence on the environment.

In the present disclosure, for the purposes of complementing and specifying the integral technical solution, better ensuring the structure of the chlorosulfonated polypropylene carbonate, and increasing the excellent properties of the chlorosulfonated polypropylene carbonate, the production method of the chlorosulfonated polypropylene carbonate mentioned above, with reference to FIG. 1, may specifically comprise the following steps:

adding polypropylene carbonate or chlorinated polypropylene carbonate 101 and a corresponding auxiliary agent 102 into a reaction vessel, and then mechanical stirring the mixture to mix them uniformly; adding sulfuryl chloride 103 in a certain ratio;

performing a chlorosulfonation reaction 104 at a constant temperature for a certain period, and then cooling the product 105 at room temperature, so that a fully biodegradable chlorosulfonated polypropylene carbonate material 106 can be obtained.

A brief reaction scheme of the present disclosure is shown as follows:

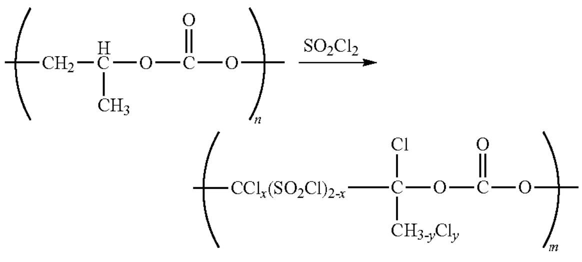

wherein x is an integer of 0-1; y is an integer of 0-3; n and m are respectively the degree of polymerization, wherein msn, and n is in a range of 50-5000.

FIG. 1 is a brief flow chart for producing the chlorosulfonated polypropylene carbonate provided by the present disclosure.

The present disclosure provides use of the chlorosulfonated polypropylene carbonate in any of the above technical solutions or of chlorosulfonated polypropylene carbonate produced by a method in any of the above technical solutions in fields of binders, sticker or coatings.

The chlorosulfonated polypropylene carbonate provided by the present disclosure has a very good adhesiveness and is an ideal adhesive, enlarging the range of use of polypropylene carbonate. As compared with most of existing modification methods for polypropylene carbonate, polypropylene carbonate modified by chlorosulfonation is achieved by using less raw materials, in which the one-pot reaction production process is more simply with a lower cost, meanwhile the chlorosulfonated polypropylene carbonate is fully biodegradable and will not create a burden to the environment.

The above-mentioned steps of the present disclosure provide a chlorosulfonated polypropylene carbonate with a specific structure, and due to the combined action of the sulfuryl group and the chlorine element, the electronegativity is greatly increased, and the electron-withdrawing ability is sharply increased, so that it can be interacted with other materials better, and thereby can be used in the fields of binders, stickers, coatings, etc. In the present disclosure, a highly active chlorosulfonyl group is introduced into the molecular chain of polypropylene carbonate, and the molecular weight of the final product becomes smaller than that of the raw material (at the time when the chlorosulfonyl group is grafted to the polypropylene carbonate, the molecular chain of the polypropylene carbonate is broken, thereby the molecular weight is decreased accordingly), which can effectively adjust and control the interface compatibility of the polypropylene carbonate with respect to various substrates, so that the state and viscosity of the product are changed.

The present disclosure is based on a biodegradable material, polypropylene carbonate, and is intended to produce a fully biodegradable material, chlorosulfonated polypropylene carbonate, which is an absolutely novel polymeric material, either in structure or in properties, by using a one-pot reaction between polypropylene carbonate and sulfuryl chloride. In the present disclosure, chlorosulfonated polypropylene carbonates with various molecular weights can be produced by a direction reaction between sulfuryl chloride and polypropylene carbonate. The number-average molecular weight of the chlorosulfonated polypropylene carbonate may be effectively adjusted and controlled in a range of between 110,000 to 4,000 by adjusting the time and temperature of the chlorosulfonation reaction, so that the state and viscosity of the product is controlled, and broad use in various fields is expected to be realized.

The present disclosure also provides a synthesis route for producing chlorosulfonated polypropylene carbonate by a one-pot reaction, wherein the chlorosulfonated polypropylene carbonate is produced by a mixed one-pot process, in which sulfuryl chloride is reacted with polypropylene carbonate directly, avoiding the use of chlorine gas and other organochlorine solvent. This route has advantages, such as the method is simple and easily carried out, and the pollution to the environment is less. Not only the negative influence of organic solvents to the environment can be prevented, but also the products in various states can be obtained according to adjustment and control of the time and temperature of the reaction, so that it is more suitable for industrialized large-scale application.

The experimental results showed that the present disclosure obtains chlorosulfonated polypropylene carbonate by a one-pot process successfully, and achieves the adjustment and control of the molecular weight in the range of 4,000-110,000, obtaining the products with various states and viscosities.

In order to further illustrate the present disclosure, the chlorosulfonated polypropylene carbonate and the preparation method thereof provided by the present disclosure will be described in detail below in connection with the Examples. However, it should be understood that these Examples are implemented on the provision of the technical solutions of the present disclosure, and the detailed manner and specific operation process for implementation are given, which is intended only to further illustrate the features and advantages of the present disclosure, rather than to limit the claims of the present disclosure, and the protection scope of the present disclosure is not limited to the following Examples.

EXAMPLE 1

20 g polypropylene carbonate (PPC) and 3 g silica ($SiO_2$) as the dispersing agent were added into a three-necked flask, and was mechanically stirred. 5.4 g of sulfuryl chloride ($SO_2Cl_2$) was added to the mixture at a normal temperature. Then, the temperature of the reaction was increased to 110° C. in an oil bath. The exhaust was treated with a sodium hydroxide solution, and the chlorosulfonation reaction was performed for 60 min. Then, the mixture was poured into a petri dish immediately, which was cooled at room temperature, so as to obtain the chlorosulfonated polypropylene carbonate in a translucent gel state.

The chlorosulfonated polypropylene carbonate produced in the Example 1 of the present disclosure was characterized and detected.

Figure 2:
FIG. 2 shows schematically an appearance image of chlorosulfonated polypropylene carbonate produced according to Example 1 of the present disclosure.

FIG. 2 is the appearance image of the chlorosulfonated polypropylene carbonate produced in the Example 1 of the present disclosure, and the sample exhibits a translucent gel state, is very viscous, and has a large amount of bubbles encapsulated in the gel.

The product obtained in the present Example of the present disclosure was subjected to a normal temperature gel permeation chromatography test.

Table 1 shows the molecular weight and the molecular weight distribution of the chlorosulfonated polypropylene carbonate produced in the Examples of the present disclosure and the pure PPC.

TABLE 1

| No. | number-average molecular weight $Mn \times 10^4$ | weight-average molecular weight $Mn \times 10^4$ | Molecular Weight Distribution Mw/Mn |
|---|---|---|---|
| Pure PPC | 11.42 | 46.42 | 4.07 |
| Example 1 | 0.79 | 1.54 | 1.95 |
| Example 2 | 0.70 | 1.36 | 1.94 |
| Example 3 | 0.41 | 0.69 | 1.69 |
| Example 4 | 1.77 | 3.91 | 2.22 |

As can be known from the results in Table 1, the molecular weight of the product is decreased from 114,200 to 7,900.

The chlorosulfonated polypropylene carbonates produced in the Examples of the present disclosure were subjected to a viscosity test (viscosity data at a normal temperature).

Figure 3:
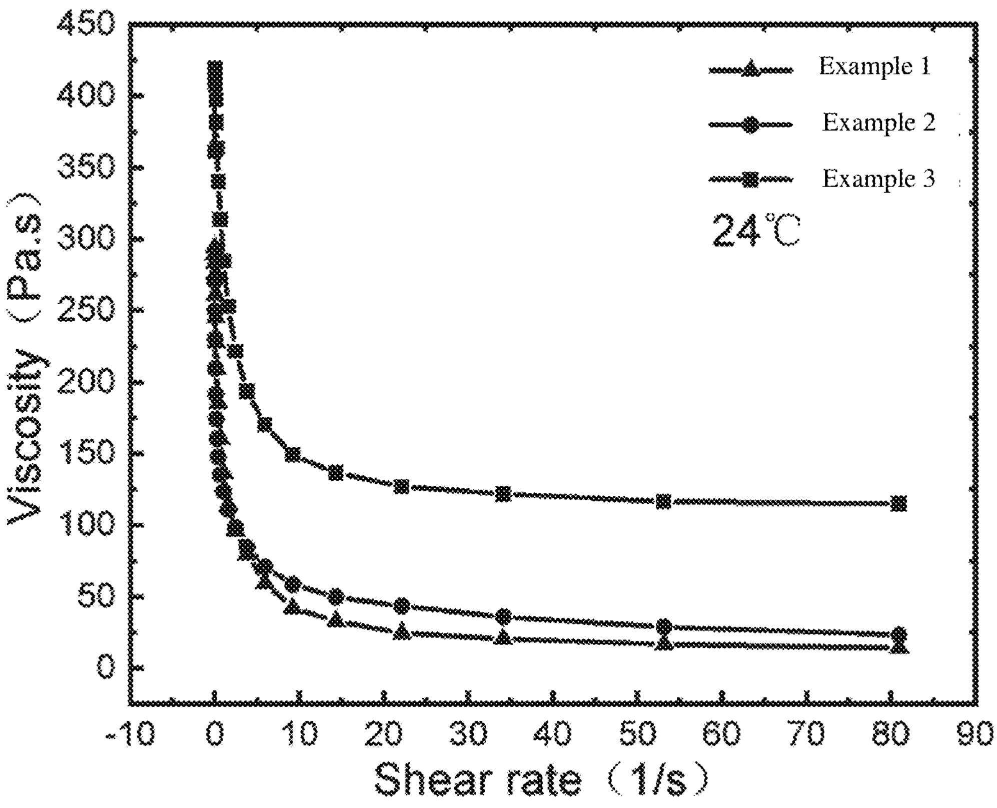
FIG. 3 shows schematically viscosity data graphs of chlorosulfonated polypropylene carbonates produced according to Examples 1, 2 and 3 of the present disclosure.

FIG. 3 shows the viscosity data of the chlorosulfonated polypropylene carbonates produced in Examples 1, 2 and 3 of the present disclosure.

The products obtained in the Example of the present disclosure were subjected to an element analysis by performing a Dumas burning process.

Table 2 shows the results of the element analysis of the chlorosulfonated polypropylene carbonates produced in the Examples of the present disclosure.

TABLE 2

| No. | Cl Content (%) | S Content (%) |
|---|---|---|
| Pure PPC | | 0.104 |
| Example 1 | 4.589 | 1.670 |
| Example 2 | 3.998 | 1.131 |
| Example 3 | 2.828 | 4.377 |
| Example 4 | 1.234 | 0.117 |

As can be known from Table 2, in the chlorosulfonated polypropylene carbonate produced in Example 1, the chlorine content is 4.589% and the sulfur content is 1.670%, thereby it is confirmed that the chlorosulfonated polypropylene carbonate is successfully produced.

The structure of the product was characterized by using H-NMR spectroscopy.

Figure 4:
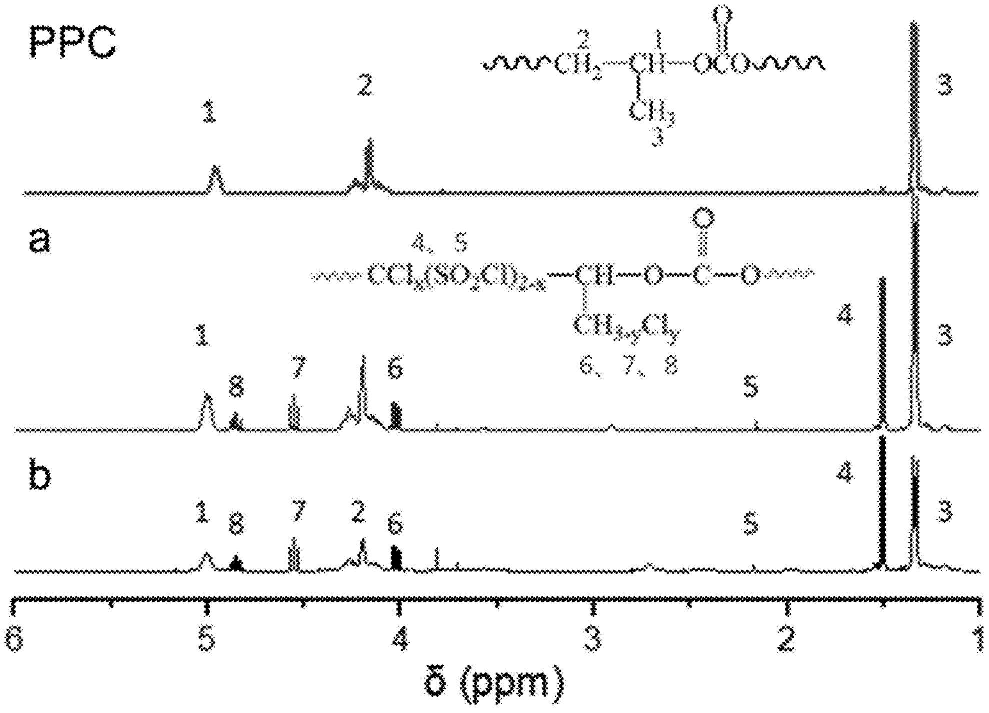
FIG. 4 shows schematically 1H-NMR spectroscopy diagrams of chlorosulfonated polypropylene carbonates produced according to Examples 1 and 3 of the present disclosure and of pure PPC.

FIG. 4 is the 1H-NMR spectrum s of the chlorosulfonated polypropylene carbonate produced in Examples 1 and 3 of the present disclosure and the pure PPC, wherein the spectrum a is the H-NMR spectrum of the chlorosulfonated polypropylene carbonate produced in Example 1.

As can be seen from FIG. 4, as compared with the spectrum of the pure PPC, there are two small peaks (peak 4 and peak 5) at 1.51 ppm and 2.19 ppm respectively, wherein the peak 4 is assigned to $—SO_2ClHC—$ generated after the methylene group in the main chain is substituted by the chlorosulfonyl group, and the peak 5 is assigned to $—SO_2ClHC—$ and $—ClHC—$ generated after the methylene group in the main chain is substituted by a chlorine atom and a chlorosulfonyl group. There are three small peaks (peak 6, peak 7 and peak 8) at 4.03 ppm, 4.56 ppm and 4.86 ppm respectively, wherein the peaks 6 and 7 are assigned to $—CH_2Cl$ generated after the side methyl group or end methyl group substituted by one chlorine atom, and the peak 8 is attributed to $—CHCl_2$ generated after the side methyl group or end methyl group substituted by two chlorine atoms.

It is further proved by the data of the NMR spectroscopy diagrams that the chlorosulfonation reaction is successfully performed.

EXAMPLE 2

20 g polypropylene carbonate (PPC) and 3 g silica ($SiO_2$) as the dispersing agent were added into a three-necked flask, and was mechanically stirred. 5.4 g of sulfuryl chloride ($SO_2Cl_2$) was added to the mixture at a normal temperature. Then, the temperature of the reaction was increased to 110° C. in an oil bath. The exhaust was treated with a sodium hydroxide solution, and the chlorosulfonation reaction was performed for 70 min. Then, the mixture was poured into a petri dish immediately, which was cooled at room temperature, so as to obtain the chlorosulfonated polypropylene carbonate in a transparent semi-fluid state.

The chlorosulfonated polypropylene carbonate produced in the Example 2 of the present disclosure was characterized and detected.

Figure 5:
FIG. 5 shows schematically an appearance image of chlorosulfonated polypropylene carbonate produced according to Example 2 of the present disclosure.

FIG. 5 is the appearance image of the chlorosulfonated polypropylene carbonate produced in Example 2 of the present disclosure, which exhibits a transparent semi-fluid state.

The product obtained in this Example of the present disclosure was subjected to a normal temperature gel permeation chromatography test.

Table 1 shows the molecular weight and molecular weight distribution of the chlorosulfonated polypropylene carbonates produced in the Examples of the present disclosure and the pure PPC.

As can be known from the Table 1, the molecular weight in the Example 2 is decreased to 7,000, which shows that the molecular weight of the product is decreased progressively with the increase in the reaction time.

As can be known from the results in Table 1, the molecular weight of the product is decreased from 114,200 to 7,900.

The chlorosulfonated polypropylene carbonates produced in the Examples of the present disclosure were subjected to a viscosity test (viscosity data at a normal temperature).

FIG. 3 shows the viscosity data of the chlorosulfonated polypropylene carbonates produced in Examples 1, 2 and 3 of the present disclosure.

The product obtained in this Example of the present disclosure was subjected to element analysis by performing a Dumas burning process.

Table 2 shows the results of the element analysis of the chlorosulfonated polypropylene carbonates produced in the Examples of the present disclosure.

As can be known from Table 2, in the chlorosulfonated polypropylene carbonate produced in Example 2, the chlorine content is 3.998% and the sulfur content is 1.131%, which shows that the degree of the chlorosulfonation was not increased with the increase in the reaction time.

EXAMPLE 3

20 g chlorinated polypropylene carbonate (CPPC) was added into a three-necked flask, and was mechanically stirred. 5.4 g of sulfuryl chloride ($SO_2Cl_2$) was added to the mixture at a normal temperature. Then, the temperature of the mixture was increased to 110° C. in an oil bath. The exhaust was treated with a sodium hydroxide solution, and the chlorosulfonation reaction was performed for 70 min.

Then, the mixture was poured into a petri dish immediately, which was cooled at room temperature, so as to obtain a chlorosulfonated polypropylene carbonate in a milky yellow fluid state.

The chlorosulfonated polypropylene carbonate produced in Example 3 of the present disclosure was characterized and detected.

Figure 6:
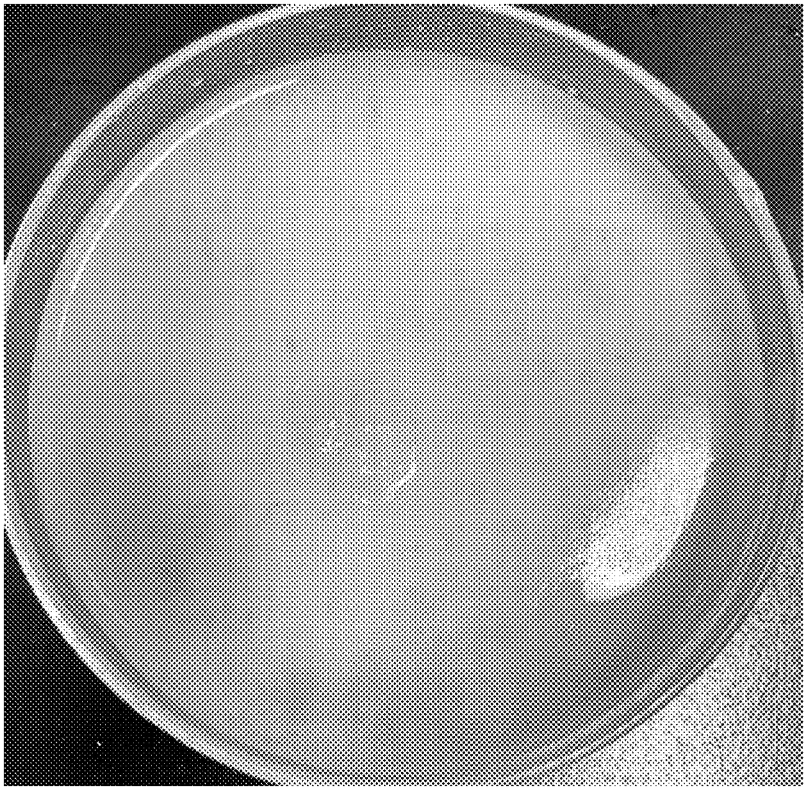
FIG. 6 shows schematically an appearance image of chlorosulfonated polypropylene carbonate produced according to Example 3 of the present disclosure.

FIG. 6 is the appearance image of the chlorosulfonated polypropylene carbonate produced in Example 3 of the present disclosure, of which the state is a milky yellow fluid state.

The product obtained in this Example of the present disclosure was subjected to a normal temperature gel permeation chromatography test.

Table 1 shows the molecular weight and molecular weight distribution of the chlorosulfonated polypropylene carbonate produced in this Example of the present disclosure and the pure PPC.

As can be known from the Table 1, the molecular weight of the product is decreased to 4,100. The degree of decrease in the molecular weight of the chlorinated PPC was higher after being subjected to further chlorosulfonation.

The chlorosulfonated polypropylene carbonates produced in the Examples of the present disclosure were subjected to a viscosity test (viscosity data at a normal temperature).

FIG. 3 shows the viscosity data of the chlorosulfonated polypropylene carbonates produced in Examples 1, 2 and 3 of the present disclosure.

The product obtained in this Example of the present disclosure was subjected to an element analysis by performing a Dumas burning process.

Table 2 shows the results of the element analysis of the chlorosulfonated polypropylene carbonates produced in the Examples of the present disclosure.

As can be known from Table 2, in the chlorosulfonated polypropylene carbonate produced in Example 3, the chlorine content is 2.828% and the sulfur content is 4.377%, which shows that the sulfur content can be increased after the chlorinated PPC is chlorosulfonated.

The structure of the product was characterized by using an H-NMR spectroscopy.

FIG. 4 is the 1H-NMR spectrums of the chlorosulfonated polypropylene carbonate produced in Examples 1 and 3 of the present disclosure and the pure PPC, wherein the spectrum b is the H-NMR spectrum of the chlorosulfonated polypropylene carbonate produced in Example 3.

As can be seen from FIG. 4, the chlorosulfonation is succeeded.

EXAMPLE 4

20 g chlorinated polypropylene carbonate (CPPC) and 3 g silica ($SiO_2$) as the dispersing agent were added into a three-necked flask, and was mechanical stirred. Subsequently, 10.8 g sulfuryl chloride ($SO_2Cl_2$) and 4.7 g dioctyl phthalate (DOP) were mixed, wherein the dioctyl phthalate was used as an organic solvent fixer to increase the degradation temperature of sulfuryl chloride. The mixed liquid was added into the three-necked flask at a normal temperature. The exhaust was treated with a sodium hydroxide solution. Then, the temperature of the reaction was increased to 80° C. in an oil bath, and the chlorosulfonation reaction was performed for 60 min. The mixture was cooled at room temperature, so as to obtain the chlorosulfonated polypropylene carbonate as a mixture of a pale yellow powder and agglomerates.

The chlorosulfonated polypropylene carbonate produced in Example 4 of the present disclosure was characterized and detected.

Figure 7:
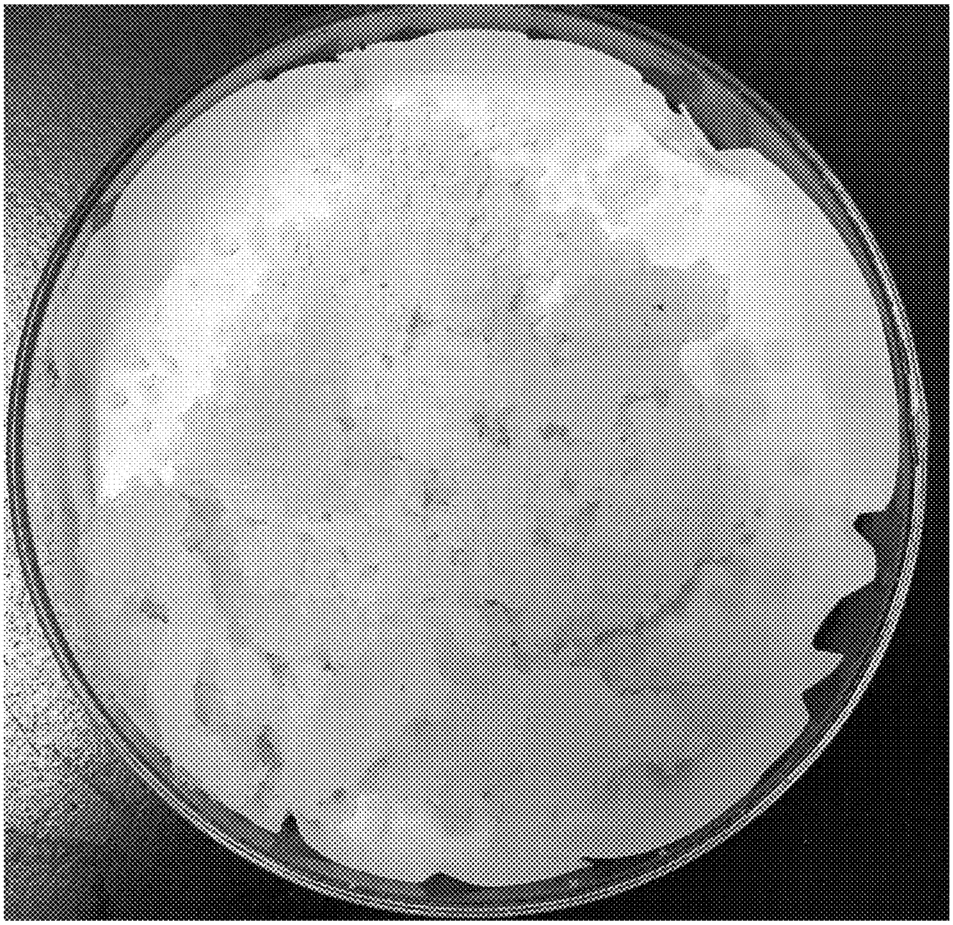
FIG. 7 shows schematically an appearance image of chlorosulfonated polypropylene carbonate produced according to Example 4 of the present disclosure.

FIG. 7 is the appearance image of the chlorosulfonated polypropylene carbonate produced in Example 4 of the present disclosure.

The product obtained in this Example of the present disclosure was subjected to a normal temperature gel permeation chromatography test.

Table 1 shows the molecular weight and molecular weight distribution of the chlorosulfonated polypropylene carbonates produced in the Examples of the present disclosure and the pure PPC.

As can be known from the Table 1, the molecular weight of the product is decreased to 17,700, which shows that the products in different states can be obtained by decreasing the temperature.

Since the state of the product was solid, the viscosity at a normal temperature could not be measured.

The product obtained in this Example of the present disclosure was subjected to an element analysis by performing a Dumas burning process.

Table 2 shows the results of the element analysis of the chlorosulfonated polypropylene carbonates produced in the Examples of the present disclosure.

As can be known from Table 2, in the chlorosulfonated polypropylene carbonate produced in Example 4, the chlorine content is 1.234% and the sulfur content is 0.117%.

The present disclosure designs and provides chlorosulfonated polypropylene carbonates with a specific structure, which are fully biodegradable materials. Meanwhile, the synthesis route via a one-pot method provided by the present disclosure is simple and easily carried out, and the pollution to the environment is less, which is green and eco-friendly, so that it is more suitable for industrialized large-scale application.

The specific embodiments and examples described above further illustrate the purpose, technical solutions and beneficial effects of the present disclosure in detail. It should be understood that the description above is merely specific embodiments of the present disclosure, and is not intended to limit the present disclosure. Any modification, equivalent replacement, improvement, etc. made according to the spirit and principle of the present disclosure should be included within the protection scope of the present disclosure.

The invention claimed is:

1. A chlorosulfonated polypropylene carbonate having a structure represented by Formula I, Formula I

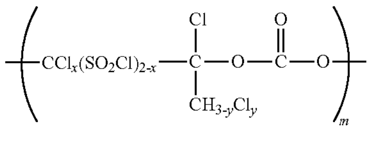

wherein x is 0 or 1; y is an integer of 0-3; and m is the degree of polymerization.

2. The chlorosulfonated polypropylene carbonate according to claim 1, wherein m is 10-500.

3. The chlorosulfonated polypropylene carbonate according to claim 1, wherein the chlorosulfonated polypropylene carbonate has a number-average molecular weight of 2,000-110,000 Daltons.

4. The chlorosulfonated polypropylene carbonate according to claim 1, wherein the chlorosulfonated polypropylene carbonate is a biodegradable material.

5. Adhesives, stickers or coatings comprising the chlorosulfonated polypropylene carbonate according to claim 1.

* * * * *